May 17, 1927.
D. H. SCHONFELD
COMBINATION PULLER
Filed May 28, 1924
1,629,003
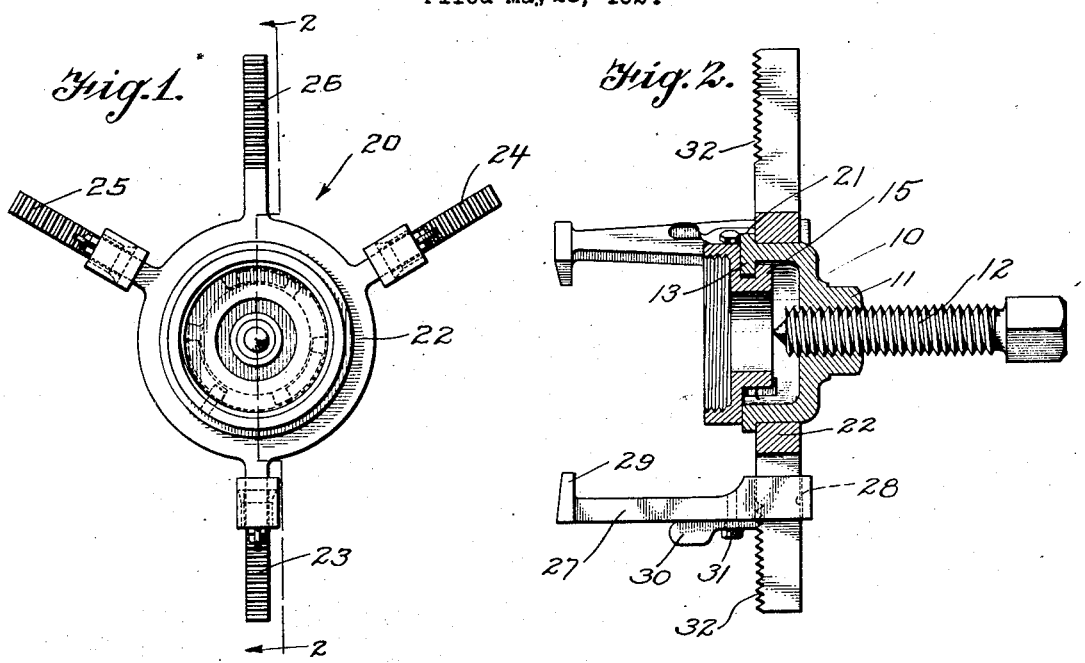
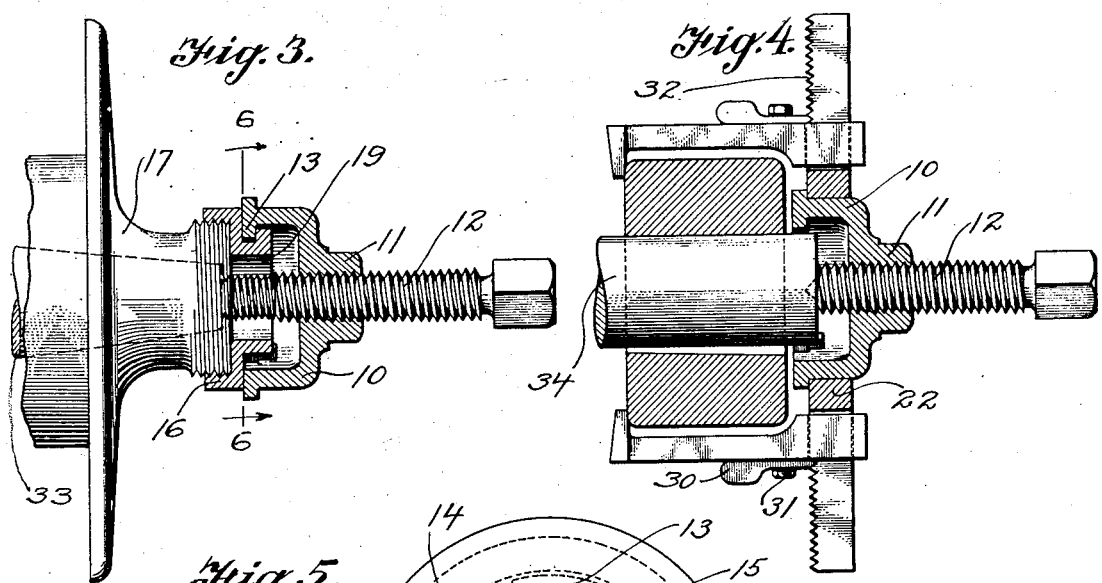
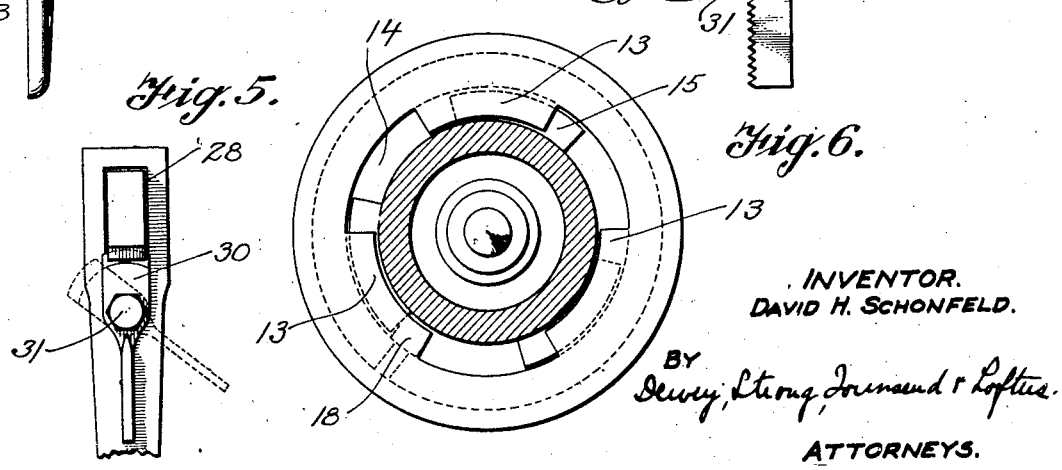
INVENTOR.
DAVID H. SCHONFELD.
BY Dewey, Strong, Townsend & Loftus.
ATTORNEYS.

Patented May 17, 1927.

1,629,003

UNITED STATES PATENT OFFICE.

DAVID H. SCHONFELD, OF FRESNO, CALIFORNIA.

COMBINATION PULLER.

Application filed May 28, 1924. Serial No. 716,369.

This invention relates to a tool, and particularly pertains to a device for use in pulling wheels, gears and the like from shafts.

It is the principal object of the present invention to provide a device readily adaptable to wheels and axles of various makes of automobiles, and which will function to draw the wheel or gear from the shaft or to pull these members back onto the shaft without difficulty.

The present invention contemplates the use of a structure together with a spider having a plurality of radial arms to which are adjustably connected clamping fingers, in the center of which interchangeable heads may be placed to engage various types of threaded hubs of automobile wheels, which wheels may be pulled off of the axis by the action of a screw carried by the head mounting.

The invention is illustrated by way of example in the accompanying drawings, in which:

Fig. 1 is a view in front elevation showing the completely assembled tool and more particularly disclosing the arrangement of the spider arms.

Fig. 2 is a view in central section through the tool as seen on the line 2—2 of Fig. 1.

Fig. 3 is a view in central longitudinal section and elevation showing the manner in which the device is adapted for pulling wheels from the axle.

Fig. 4 is a view in central longitudinal section showing the manner in which the device is adapted for pulling gears or other like members from a shaft.

Fig. 5 is an enlarged fragmentary view showing one means of adjustably locking the clamping fingers to the radial arms of the spider.

Fig. 6 is an enlarged view through the structure as shown on the line 6—6 of Fig. 3.

Referring more particularly to the drawings, 10 indicates a hub member having a centrally disposed boss 11 projecting from the ends thereof and being interiorly threaded to receive a pressure screw 12. The head member 10 is cup shaped, the mouth of the cup being formed with three arcuate and radially extending flanges 13 disposed in equal spaced relation to each other, and thus providing intermediate arcuate throats 14 through which flanges 15 of interchangeable adapters 16 may pass.

The adapters 16 may be of various designs, but they all are formed with a cylindrical neck agreeing substantially in outside diameter with the inner arcuate edges of the flanges 13, and on the end of which neck the outwardly projecting arcuate flanges 15 are formed.

Cups and other structures of various designs form a part of the adapter 16 and may be internally threaded to accommodate the variously pitched threads of automobile wheel hubs as indicated at 17. It will be evident that the adapter 16 may be interchanged and interlocked with the head 10 passing the flanges 15 through throats 14 between the flanges 13 of the head and then rotating the two members relative to each other until one of the flanges 15 abuts against a stop pin 18. The adapter will be temporarily locked in position relative to the head.

A central passageway 19 is formed through the adjusters so that they will accommodate the screw 12 and permit it to bear against the end of the axle upon which the wheel is mounted. By the use of these two members alone the device may be readily adapted for removing wheels of various designs. When, however, satisfactory purchase cannot be obtained by pulling on the hub a spider structure 20 may be used in connection with the head 10.

By reference to the drawings, it will be seen that the mouth of the cup end of the head 10 is formed with a circumferential flange 21. The spider is formed with an annular ring portion 22 through which the cup of the head projects, and which ring may seat against the back face of the flange 21. The spider as shown in Fig. 1 is provided with a peculiar arrangement of radial arms. Arms 23, 24, and 25 are disposed at one hundred twenty degrees to each other, while there is positioned between arms 24 and 25 and 26 disposed at one hundred eighty degrees the arm 23. By this arrangement a three point pull may be obtained by the arms 23 and 25 inclusive, or when desired, a two point pull may be obtained by the use of arms 23 and 26. These arms are intended to receive a plurality of gripping members such as the fingers 27. The fingers are formed with eyes 28 through which the arms extend and which permit the fingers to each move longitudinally of the arms without displacement. The opposite ends of the fingers are formed with lugs 29 adapted to engage convenient portions of the structure to be removed.

In order to hold the fingers in adjacent position relative to the radial arms, suitable locking means must be provided. It will be evident that various forms of locks might be used without departing from the spirit of the invention, and, therefore by example, a swinging cam 30 is provided. This cam is pivotally mounted on fingers by a screw 31 and may swing to a position in longitudinal alignment with the fingers as indicated in Fig. 5, at which time an edge of the finger will be in register with serrations 32 formed along one edge of the radial arms as more clearly shown in Fig. 4.

In operation of the present invention, the various elements may be assembled with a view to performing a pulling action either by engaging the hub of a wheel or by embracing certain members by the fingers 27 to exert a pull when the screw 13 is turned to advance through the head 10. When a wheel is to be removed by a pull on its hub, an adapter 16 may be selected agreeing with the particular design of the hub and the throat on this adapter may then be fitted into the head in the manner shown in Fig. 6. This may be most conveniently done after the adapter has been screwed onto the hub. A tightening up of the screw 13 will therefore cause its point to press against the end of the vehicle axle 33 and cause the wheel to be pulled longitudinally thereof. When gears or other like members are to be drawn from a shaft, or when a wheel is to be pulled off by applying a pulling action at other points than on the hub, the spider 20 may be slipped over the head 10 and the fingers may be adjustably disposed upon the radial arms of the spider to embrace the member to be removed. It will be evident that the same force applied by rotating the screw will tend to draw the gear or other member longitudinally of its shaft as indicated by the numeral 34 in Fig. 4.

It will thus be seen that the invention here disclosed provides a wheel puller and the like of simple construction, but which is adapted for many uses and may be instantly adapted to accommodate automobile wheels of various designs and having threads of various pitch.

While I have shown the preferred form of my invention as now known to me, I wish it understood that various changes may be made in its construction without departing from the spirit of the invention as defined in the appended claim.

Having thus described my invention, what I claim and desire to secure by Letters Patent is:

A wheel puller comprising a cup shaped head member, a pressure screw threaded through a threaded opening in the end of said head member, a plurality of arcuate inwardly projecting flanges arranged in spaced relation to each other around the mouth of the cup, an adapter adapted to be threadedly connected to the hub of a wheel, arcuate flanges on the adapter complementary to the flanges on the head member and capable of interlocking therewith to removably connect the adapter to the head member with the adapter positioned concentric to the pressure screw, said flanges when interlocked resisting relative axial movement between the head member and the adapter, and a radial flange projecting outwardly from the exterior surface of the head member and circumscribing the same at the point thereon where the head member connects with the adapter whereby a clamping device may be arranged on the head member and abut against the flange so that operation of the head member will operate the clamping structure.

DAVID H. SCHONFELD.